United States Patent Office 2,942,466
Patented June 28, 1960

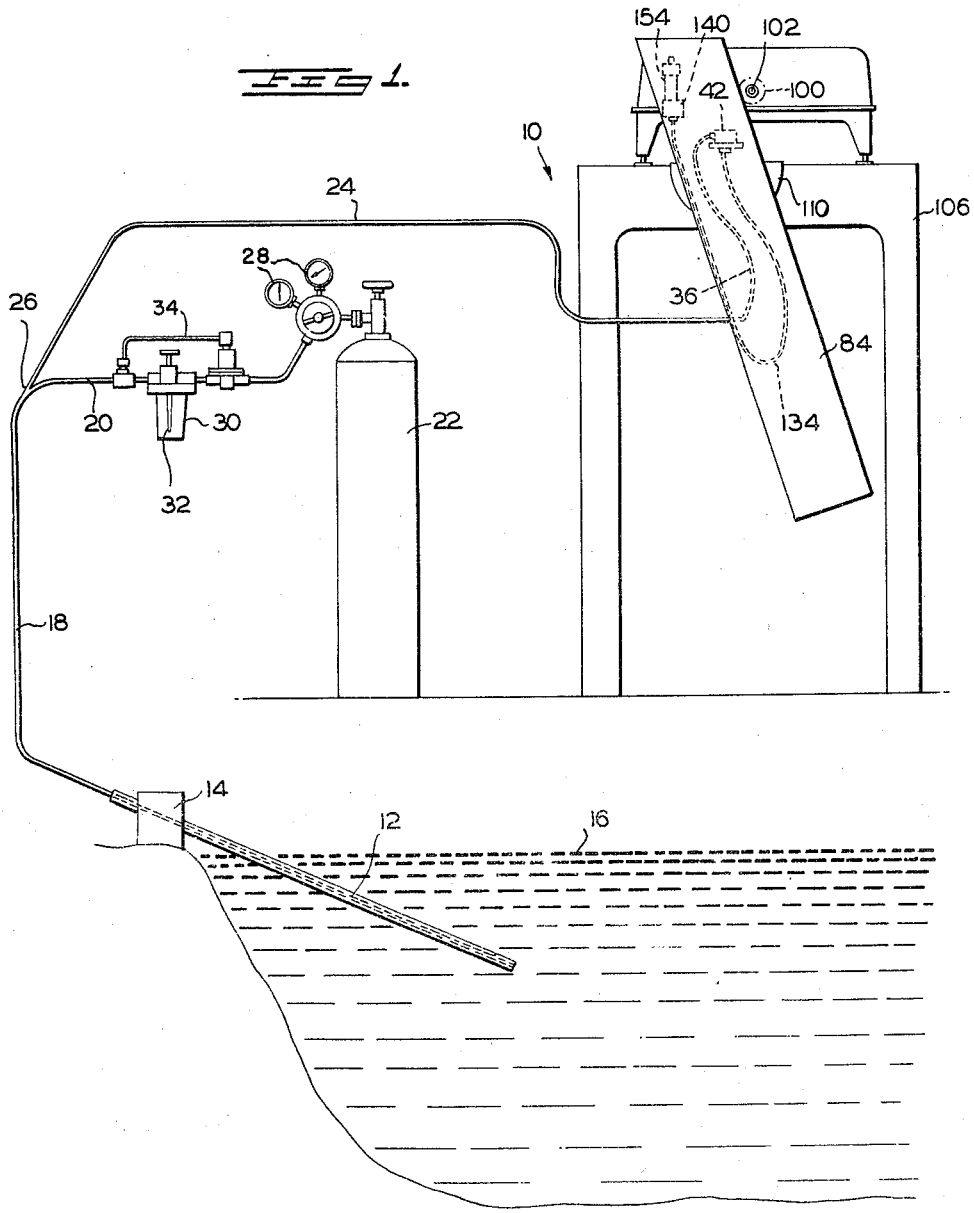

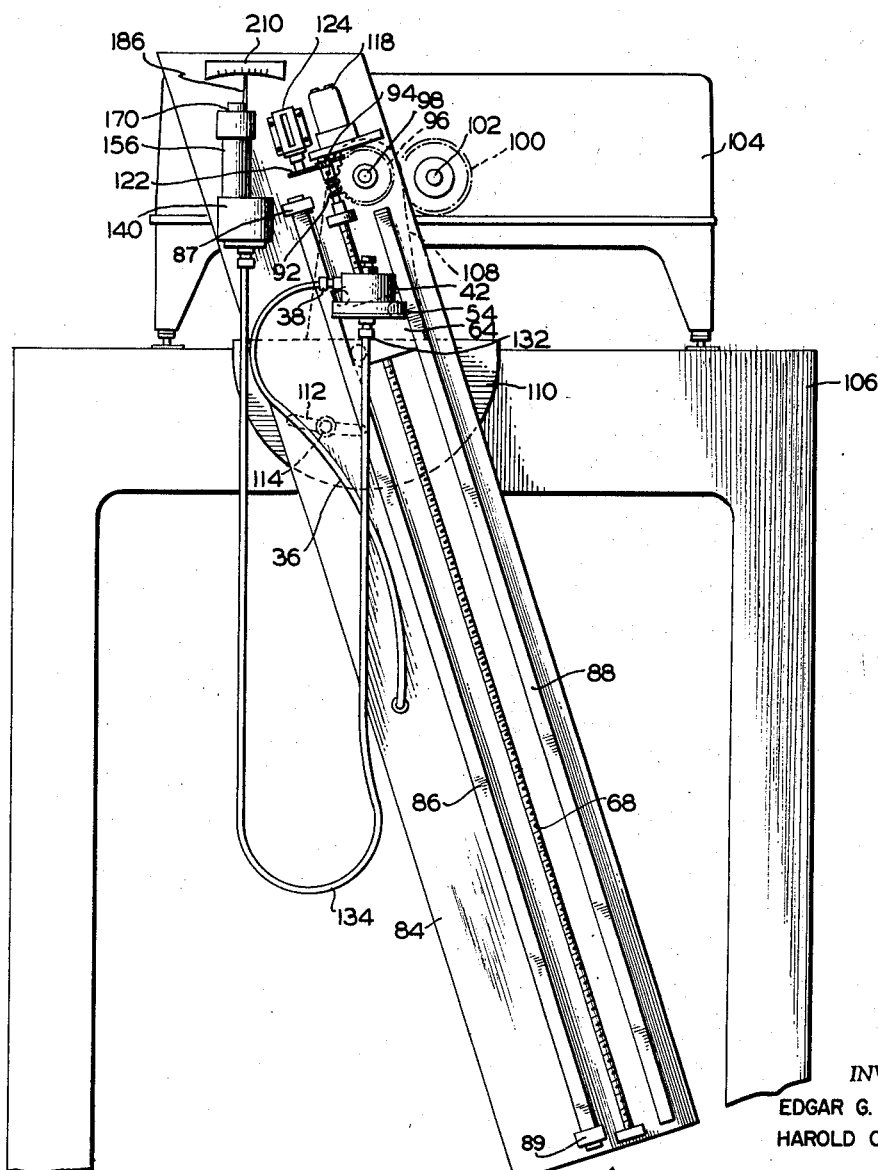

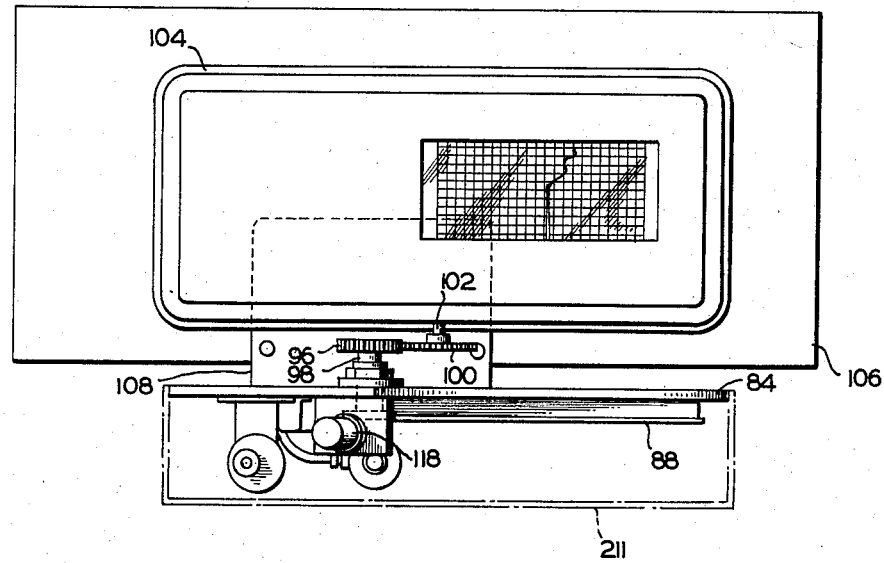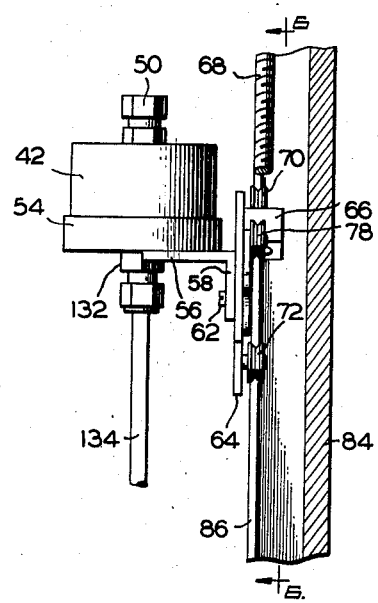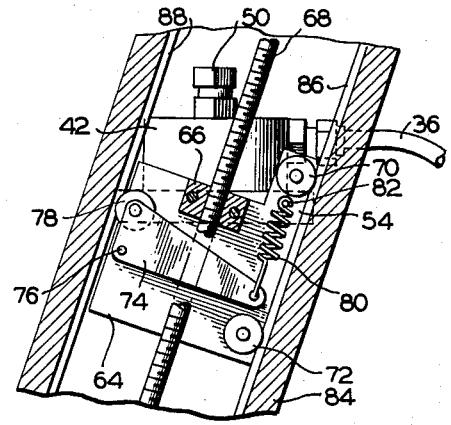

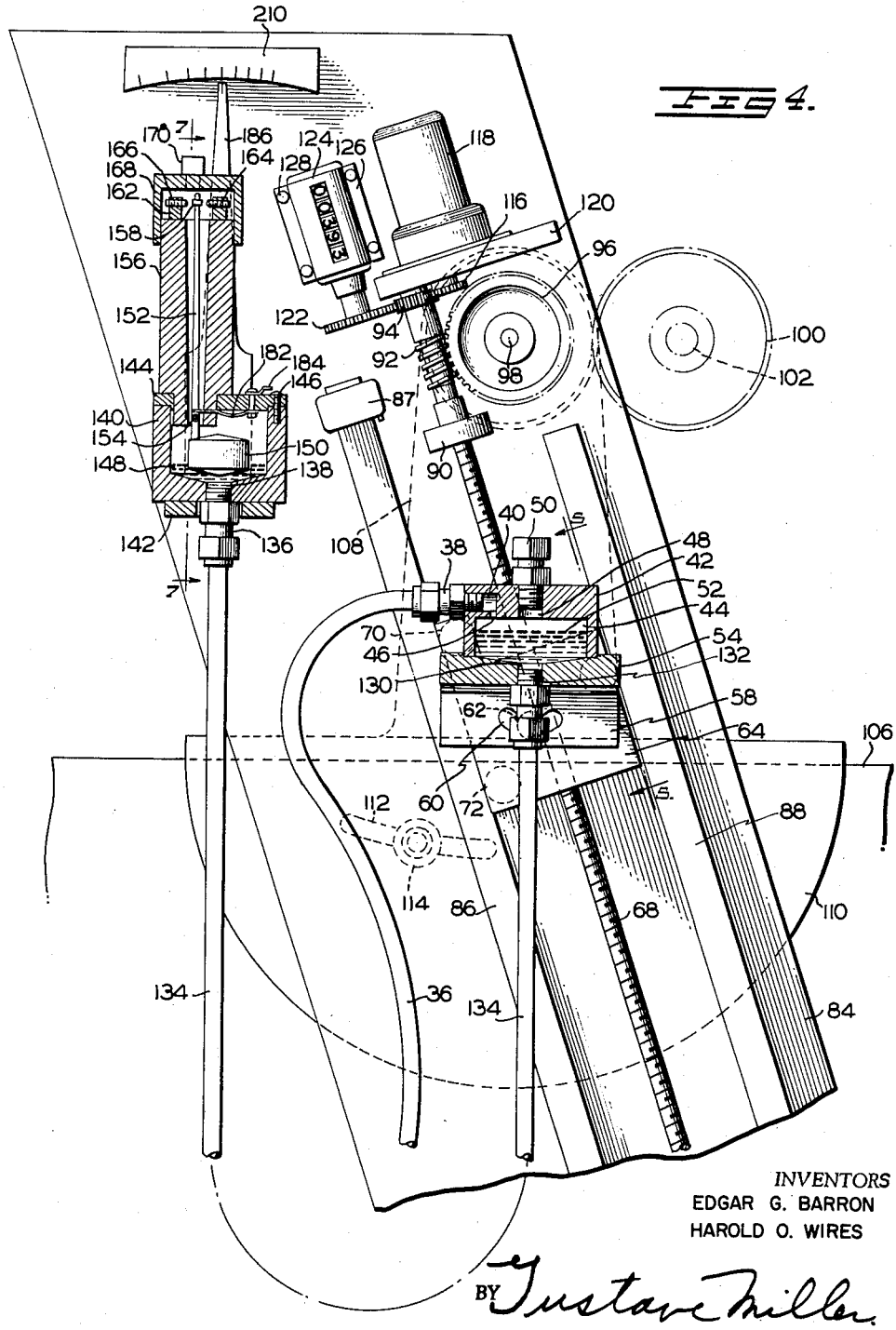

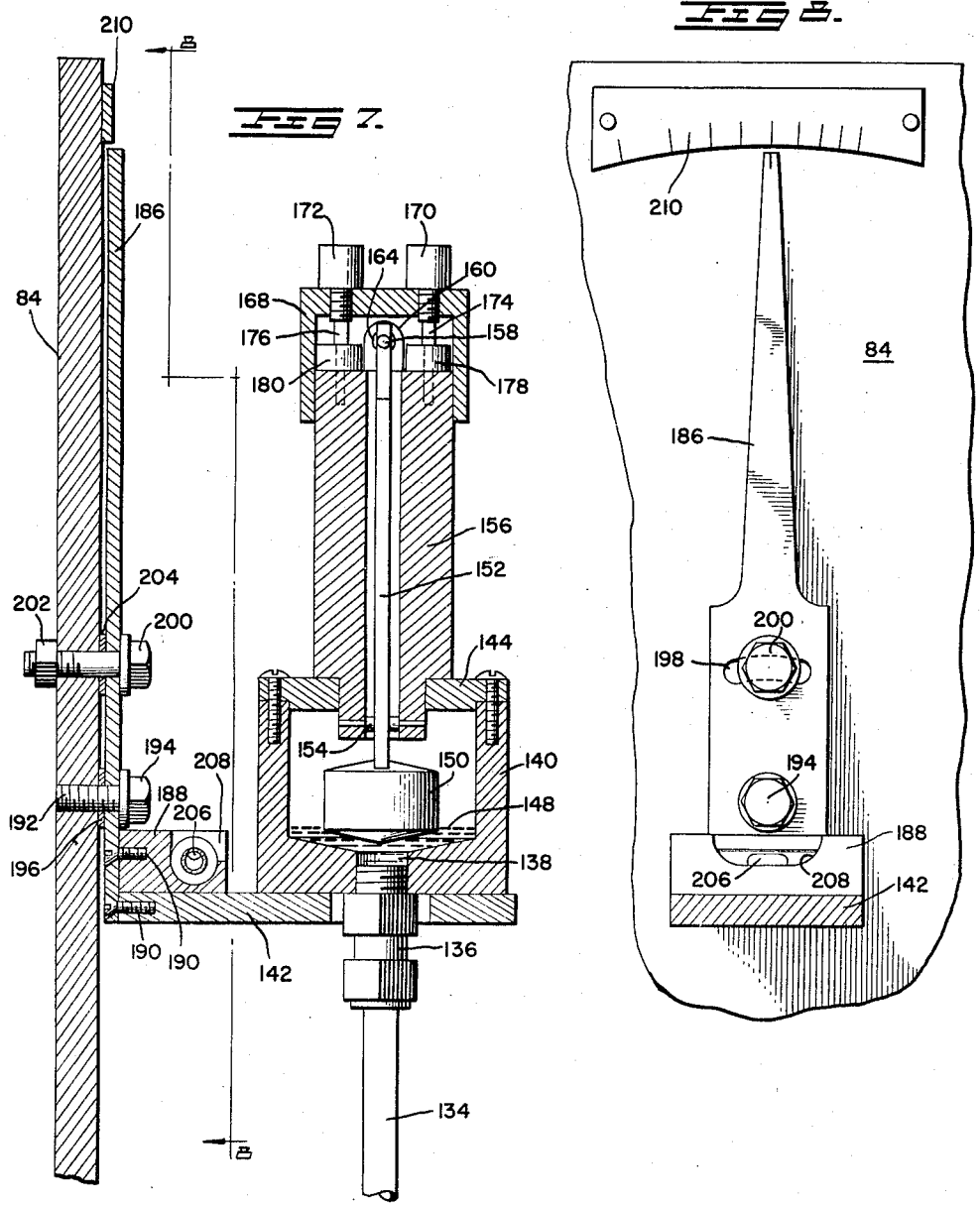

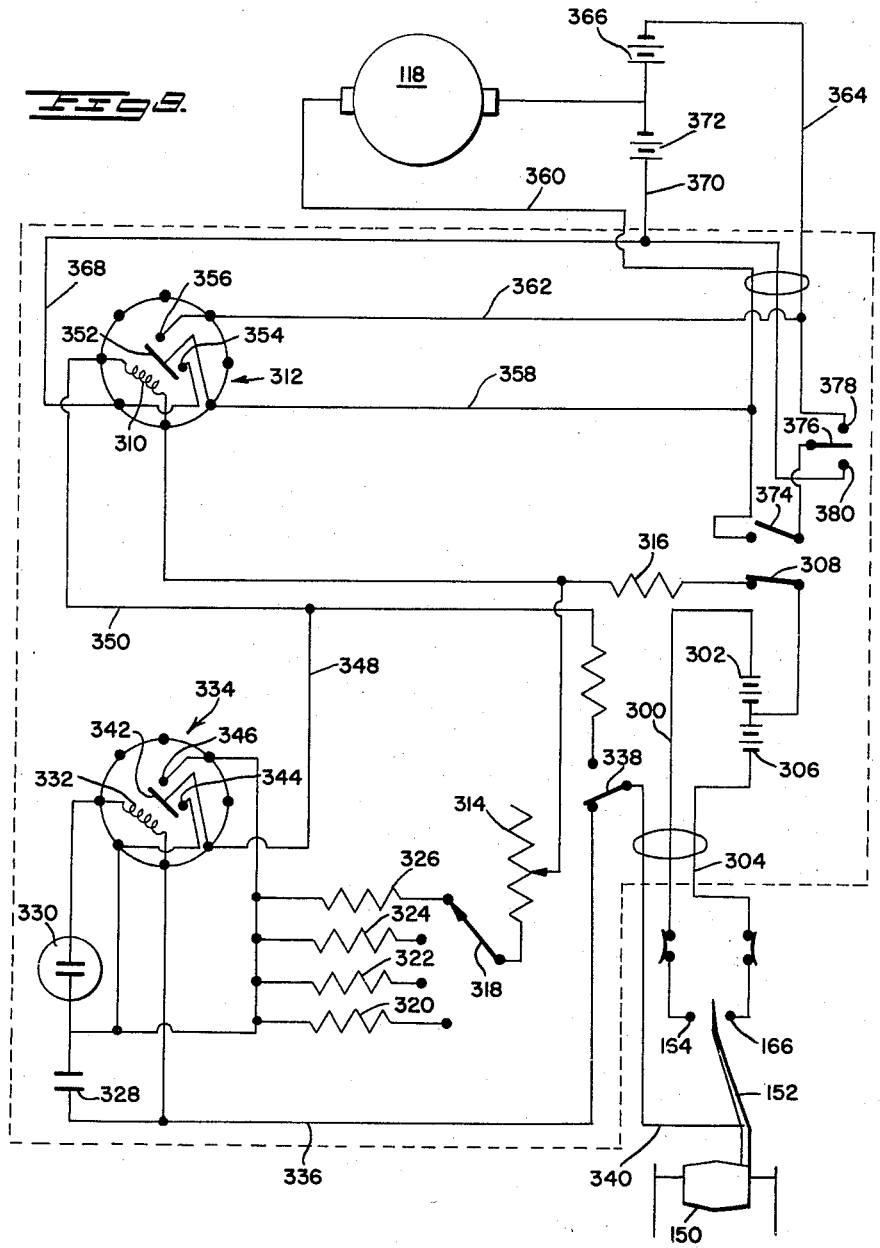

2,942,466

MOTORED MANOMETER FOR INDICATING AND RECORDING FLUID LEVEL VARIATIONS

Edgar G. Barron and Harold O. Wires, both of % Harold O. Wires, 1509 Hess St., Columbus, Ohio Filed Oct. 30, 1956, Ser. No. 619,246

15 Claims. (Cl. 73—302)

This invention relates to a pressure recording system, and it particularly relates to a system for measuring the water level of a body of water by means of a pressure differential.

The types of measuring and recording systems heretofore used were not completely adequate for accurate measurement because of the inherent mechanical deficiencies in the equipment. They were, furthermore, not sufficiently sensitive to record very small, but yet significant variations in the water level.

In addition to the above, the prior systems which generally included the use of a float and pulley arrangement, required the digging of wells at the side of the body of water, and such wells had to be dug as deep as the river, stream, or the like, would ever be expected to drop. This was not only time-consuming and expensive, but required the setting up of permanent installations which required continuous care and maintenance and which were useful only for the one particular body of water.

It is one object of the present invention to overcome the above and other disadvantages by providing a measuring and record-motored manometer system which can be used with any body of water, oil, or other fluid, and which can be transported from one area to another.

Another object of the present invention is to provide a measuring and recording motored manometer system for liquid level variations which can be adjusted to the local conditions, such as water or oil of varying densities, etc., easily and quickly.

Another object of the present invention is to provide a measuring and recording manometer system which is extremely sensitive to small variations and very accurate in its measurements.

Other objects of the present invention are to provide an improved measuring and recording system, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a general, elevational view of the measuring and recording system embodying the present invention, showing it in operation while measuring the level of a body of water.

Fig. 2 is an enlarged, detailed, elevational view of recording apparatus.

Fig. 3 is a top plan view of the mechanism shown in Fig. 2.

Fig. 4 is an enlarged, fragmentary, view, partly in section and partly in elevation of the apparatus shown in Fig. 2.

Fig. 5 is a view, partly in section and partly in elevation, taken on line 5—5 of Fig. 4.

Fig. 6 is a view, partly in section and partly in elevation, taken on line 6—6 of Fig. 5.

Fig. 7 is a view, partly in section and partly in elevation, taken on line 7—7 of Fig. 4.

Fig. 8 is a view, partly in section and partly in elevation taken on line 8—8 of Fig. 7.

Fig. 9 is a schematic view of the relay control unit used to actuate the drive motor.

Referring now in greater detail to the drawings wherein similar reference characters refer to similar parts, there is shown a motored manometer or measuring and recording apparatus, generally designated 10, which includes a tube 12 mounted on a bracket 14 on the bank and extending into the upper surface of a body of water 16.

The tube 12 has a fluid connection through a tube 18 to a tube 20 leading to a source of fluid pressure which is, in this case, a tank 22 containing a gas, such as nitrogen, under pressure. The tube 20 is also connected to tube 24 which is, itself, an extension of tube 18. The intersection of the three tubes is indicated at 26.

A pressure indicating dial system 28 is interposed in the tube 20. Also interposed in this tube is a transparent housing 30 having a needle valve 32. This needle valve permits a small amount of gas to bubble through the housing which acts as a sight feed to indicate the flow of the pressure fluid through the line. A by-pass conduit 34 is provided to equalize the pressure on both sides of the sight feed. The flow of pressure fluid is indicated in the sight feed by the bubbling action through a liquid which is preferably held in the housing of the sight feed. The pressure fluid, such as nitrogen, is maintained both in the tube 12 and in the tube 24, which is connected to a conduit or tube 36. This conduit 36 is connected, at its upper end, to a nipple 38 extending from an opening 40 in a housing 42. This opening 42 is in fluid connection with a chamber 44 in the housing through an orifice 46. Another opening 48 is provided in the housing 42; this opening 48 being threaded and acting as a filling means. A threaded plug 50 is used to close the filling opening 48. The housing 42, itself, may be made of any desired material; however, it is preferably transparent to permit a view of the chamber 44. A pool of mercury 52 is maintained in this chamber 42.

The housing 42 is mounted on a supporting platform 54, and this platform 54 is, itself, mounted on a bracket 56 having a vertical flange 58 at one side. The flange 58 is provided with an arcuate slot 60 through which extends a bolt 62. This slot and bolt provides an arcuately adjustable means for connecting the bracket to a carriage in the form of the plate 64. This plate 64 has a threaded nut portion 66 for threadedly receiving a threaded shaft 68. As can be seen, the housing 42 and its supporting platform 54 is angularly inclined to the plate 64 and the shaft 68. Actually, the housing 42 is preferably positioned in a straight horizontal position while the plate 64 and shaft 68 are inclined at a predetermined angle, as will hereinafter be more fully explained.

The plate 64 is provided, at one side, with an upper roller 70 and a lower roller 72. A lever 74 is pivoted to the plate, as at 76, and holds a roller 78 at the opposite edge of the plate from where the rollers 70 and 72 are positioned, the roller 78 also being intermediate the other two rollers. The end of the lever opposite the roller 78 is connected to a spring 80, the other end of which is connected to the plate, as at 82.

The plate 64 rides up and down on a supporting member or guide structure 84 and the rollers 70, 72 and 78 ride on rails 86 and 88 on the supporting member 84.

In order to press the rollers firmly against the rails, the spring 80 resiliently urges roller 78 against rail 88 and this action, in turn, forces the opposite rollers 70 and 72 firmly against the rail 86.

The upper end of the threaded shaft 68 is rotatably supported in a bracket 90 and above the bracket support 90, the shaft is provided with a worm 92. At the upper end of the shaft 68, above the worm 92, the shaft 68 is provided with a gear 94. The worm 92 meshes with a gear 96 mounted on a shaft 98, and this gear 96 is, in turn, in mesh with a gear 100 mounted on a shaft 102 extending from a graphic recording instrument 104. This instrument 104 is of the ordinary type available commercially for making a continuous graph of data against time.

The instrument 104 is mounted on top of base or table, or the like, 106. This table 106 also supports the supporting member 84 for pivotal adjustment thereon by means of an arm 108 connected, at its upper end, to the rotatable shaft 98, and connected, at its lower end, to a rocker 110. The rocker 110 is provided with an arcuate slot 112 which receives the head of a bolt 114 on the side of the table. By loosening the bolt 114, the rocker can be pivotally adjusted one direction or the other throughout the arcuate length of the slot 112. When the proper position is reached, the bolt is tightened to secure the rocker, and, therefore, the arm 108 and guide structure 84, in adjusted angular position.

The gear 94, at the upper end of the shaft 68, meshes with a gear 116 mounted on the armature shaft of a reversible motor 118; this motor being supported on a platform 120 extending from the face of the supporting member 84. On its opposite side, the gear 94 is in mesh with a gear 122 mounted on the actuating shaft of indicator mechanism 124 which is provided with indicator numerals for $\frac{1}{100}$ of a foot; this indicator mechanism being supported by flanges 126 secured to the guide structure 84 by bolts, rivets, screws, or the like, indicated at 128, and serves to indicate the liquid level at any existing moment.

The housing 42, containing the mercury pool 52, is also provided with an opening 130 on its underside. This opening 130 is threaded to threadedly receive a nipple 132. Depending from the nipple 132 is a conduit 134. This conduit or tube 134 is connected, at its opposite end, to a nipple 136 which is threadedly engaged in a bottom opening 138 of a housing 140. This housing 140 is mounted on a platform 142 connected to the face of the supporting member 84, and is provided with a removable top wall 144 fastened by screws 146. This removable top wall permits insertion and removal both of a pool of mercury 148 and of a float 150. This float 150 is provided on the top thereof, eccentric of its axis, with a rod 152. This rod is pivotally connected as by a pivot pin 154, adjacent to its bottom portion, and extends through an elongated housing extension 156 rising from the top wall 144 of the housing 140. The rod 152 extends within the housing extension to the upper end thereof, and is provided, at its upper end, with a switch contact portion 158. This switch contact 158 is positioned between two oppositely-disposed blocks 160 and 162 having adjustable contacts 164 and 166 mounted therein. A terminal cap 168 encloses the upper end of the housing extension 156, and this terminal cap is provided with terminal plugs 170 and 172 having pins 174 and 176 in contact with pin jacks 178 and 180 in the housing extension 156. The bottom portion of the rod 152 is electrically connected by wire 182 to a contact member 184 on the wall 144 of housing 140. These various contacts, plugs, pins, etc. provide the means for forming an electrical circuit between the switch contact 158 and the actuating network for the motor 118.

The connection between the platform 142, supporting the housing 140, and the supporting member 84 is a pivotal connection as best shown in Fig. 7. This pivotal connection is between a pointer 186, connected to a block 188 on the platform 142 by means of screws 190. The pivot point is formed by a fixed bolt 192 extending out from the face of supporting member 84 and through a corresponding opening in the pointer. The bolt head 194 holds the pointer on the bolt, and a washer or spacer 196 is provided around the bolt between the pointer and supporting member. An arcuate slot 198, shown in Fig. 8, is provided in the pointer, above the pivot point, and through this arcuate slot extends a bolt 200 releasably held in place in the member 84 by a nut 202. A washer 204 surrounds the bolt 200 between the pointer 186 and member 84. By means of this arcuate slot and bolt connection, the pointer may be held in adjusted position around the pivot bolt 192.

The pivotal pointer 186 is used to readjust the level of housing 140, and consequently of the mercury pool 148 therein. A level indicator such as a tube of mercury, or the like, is provided at 206 in visible position within the cut-out portion 208 of block 188. The angular adjustment of the pointer required to level the mercury is indicated on a scale 210 connected to the member 84 and coacting with the pointer.

A transparent housing 211 for enclosing the supporting member 84 and the parts supported therein is pivoted to one side of the housing.

In operation, the tube 12 as well as the tubes 24 and 36 are filled with gas, such as nitrogen, from tank 22. This gas maintains a certain pressure on the mercury pool 52 in housing 42 which is sufficient to maintain the level of pool 148 in housing 140 at a height where the float 150 keeps pivoted rod 152 straight. In this position, contact 158 is between the two contacts 164 and 166. When the water level in the body of water 16 increases, it creates a pressure which forces up the gas into the chamber 44 in housing 42. This depresses the pool 52, which acts through the mercury column in tube 134 to raise the level of pool 148 in housing 140. This raises the float 150 and causes rod 152 to pivot to the left, as viewed in Fig. 4. This brings contact 158 against contact 166 and, thereby energizes a circuit to a battery which causes the reversible motor 118 to rotate in one direction. The gear 116 on the motor shaft then acts through gear 94 to rotate shaft 68 in a direction to threadedly move the housing 42 downwardly relative to housing 140. When the null or balanced condition between the two mercury pools 52 in housing 42 and 148 in housing 140 is reached, the float 150 descends and moves the contacts away from each other. This stops the motor. Limit switches 87 and 89 at the top and bottom of one rail 86 are provided in the path of the carriage plate 64 carrying movable housing 42 to prevent the carriage from overrunning the ends of threaded shaft 68.

During the operation of the motor and rotation of the shaft, the gear 96 is rotated by worm 92 on the shaft and, in turn, rotates gear 100 to operate the stylus in the graphic recorder 104. At the same time, gear 94 rotates gear 122 to operate the indicator 124 which is calibrated numbers in $\frac{1}{100}$ of a foot, corresponding to the depth of the body of water 16.

If the water level is lowered, the reverse operation takes place whereby contact 158 moves against contact 164 and activates a battery of opposite polarity to operate the motor 118 in the reverse direction. This moves the housing 42 up and moves the stylus in the recorder 104 in the opposite direction.

The threads on the shaft 48, the teeth on the gear 116 and the dimensions of the graph paper in the recorder are correlated with each other to accurately measure the change in water level, which is also continuously indicated on the indicator 124.

If a stream or other body of water is in a locality which normally has water of a specific gravity different from 1.00, it is desirable to be able to compensate for this difference without changing gear ratios or threads per inch on the shaft 68. This is accomplished in the present invention by securing the supporting member 84 at an angle to the vertical. Since the shaft is thereby inclined while the housing 42 remains vertical because of its angular connection to the shaft 68, the ratio of the number of turns of the shaft to the distance moved by the housing may be made variable. This is accomplished by changing the inclination of the supporting member 84 by means of the rocker 110 to correspond to the variation in specific gravity of the water.

Since the change of inclination of member 84 also changes the position of the housing 140, this housing 140 is brought back to the vertical by pivoting it around bolt 192 until the level indicator 206 shows it in proper position. The angle of change of the inclination of the member 84 is then indicated by pointer 186 on scale 210. The member 84 can be adjusted until the required density correction is indicated on the scale 210.

Although the desired action is obtained with the apparatus described above, the contact pressure available is much too light to maintain the current required by the motor. Furthermore, under natural stream conditions, a constant surging action takes place which would tend to keep the motor 118 almost constantly running in a hunting manner. It is, therefore, necessary to use a relay circuit such as indicated in Fig. 9 which requires very little amperage in order to operate the motor 118 and to use a time delay circuit to eliminate the hunting action of the motor 118 due to surging of the water level. An electrical network to effect these desired operations is illustrated in Fig. 9.

The diagram in Fig. 9 shows the float 150 having the pivoted rod 152 between the contacts 164 and 166. Contact 164 is connected through line 300 to battery 302, and contact 166 is connected through line 304 to battery 306. The batteries are in circuit through normally closed switch 308 with both the coil 310 of relay 312 and with a potentiometer 314 through a resistance 316. The potentiometer is connected through at selector switch 318 with a delay circuit including resistors 320, 322, 324, and 326 of gradually increasing ohmic values. The resistor selected depends on the length of the surges encountered. The selected resistor, in conjunction with capacitor 328, applies a predetermined delayed impulse to glow tube 330 which is in circuit with one end of coil 332 of relay 334. The opposite side of coil 332 is in circuit with contact rod 152 through line 336, switch 338, which is normally closed, and line 340.

The coil 332, when energized by glow tube 330, moves switch 342 against contacts 344 or 346 depending upon polarity of capacitor charge in the delay circuit. The switch 342 is connected through line 348 and line 350 to the coil 310 in relay 312, and, upon being moved against contacts 344 or 346, establishes a circuit by shunting out the selected resistor in group 320 to 326, from the delay relay 334 to the actuating relay 312.

The coil 310, upon being energized, moves switch 352 against contacts 354 and 356. This places one side of the motor 118 in circuit with the relay through switch 352, line 358 and line 360. At the same time, contact 356 is in circuit, through line 362 and line 364, with the battery 366 for energizing the motor in one direction while contact 354 is in circuit, through lines 368 and 370, with opposite battery 372. If the circuit is from contact 166 through battery 306, the current is through battery 366. However, with rod 152 in engagement with contact 164, the circuit is through battery 302 and battery 372 energizes the motor.

If the housing 42 is desired to be moved independently of the servo system shown in Fig. 9, the switch 374 is closed, which action simultaneously opens switch 308 and the switch 376 is moved against either contact 378 or 380 to close the independent circuit to the motor either through battery 366 or battery 372 depending on contact 378 or 380 being engaged.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. The system of claim 11 wherein said electrical network includes said electrical switch which has a movable contact adapted to alternately engage either of a pair of fixed contacts, one of said fixed contacts being in circuit with a first battery of one polarity and the other of said fixed contacts being in circuit with a second battery of opposite polarity, both of said batteries being in circuit with the coil of a first relay and with the coil of a second relay, said second relay including a resistance-capacitor circuit wherein the resistor is selectively variable, and also including a glow tube, said glow tube being fired upon a predetermined voltage being applied across the resistor-capacitor circuit, said second relay being in circuit with the coil of said first relay to energize said first relay upon firing of said glow tube, and said first relay being in circuit with the motor through individually activated motor actuating batteries of opposite polarity.

2. The network of claim 1 wherein a normally closed switch is provided to open the circuit between the contacts and the motor actuating batteries.

3. The network of claim 2 wherein a normally open switch means is provided to form a closed circuit between said motor-actuating batteries and said motor when said normally closed switch is open.

4. The network of claim 1 wherein said resistor-capacitor circuit includes a plurality of resistors of different ohmic values, and a selector switch selectively placing each of said resistors individually in the circuit.

5. In a fluid condition indicating system, a pressure responsive member adapted to be extended into a body of fluid, means for introducing gas under pressure into said pressure responsive member, a base, a support angularly disposed on said base, a first housing, means mounting said first housing on said support, a first manometer liquid pool in said first housing, a fluid connection between said pressure responsive member and said first housing, a second housing, means mounting said second housing on said support, a second manometer liquid pool in said second housing, a conduit connecting said first and second housings, a column of manometer liquid in said conduit, a linear track on said support, means carried by said first housing engaging said track for movement of said first housing therealong, a screw shaft threadedly engaged by said first housing, reversible motor means mounted on said support for rotating said screw to move said first housing, an electrical switch associated with said second housing, actuable by variations in the level of said second manometer liquid pool to actuate said motor means in either direction, the level of said manometer liquid pool being determined by pressure of gas in said first housing, and the pressure of said gas being determined by the condition of the fluid being indicated relative to said pressure responsive member, an indicating means, gearing operatively connecting said indicating means to said motor for simultaneous actuation with said shaft, and means for varying the angular inclination of said support relative to said base to compensate for variations proportioned to pressure in a condition of said fluid other than the condition indicated, by varying the mean vertical movement of said first-mentioned housing and its associated manometer liquid pool without varying the actual linear movement thereof.

6. In a fluid condition indicating system, a pressure responsive member adapted to be extended into a body of fluid, means for introducing gas under pressure into said pressure responsive member, a base, a support angularly disposed on said base, a first housing, means mounting said first housing on said support, a first manometer liquid pool in said first housing, a fluid connection between said pressure responsive member and said first housing, a second housing, means mounting said second housing on said support, a second manometer liquid pool in said second housing, a conduit connecting said first and second housings, a column of manometer liquid in said conduit, a linear track on said support, means carried by said first housing engaging said track for movement of said first housing therealong, a screw shaft threadedly engaged by said first housing, reversible motor means mounted on said support for rotating said screw to move said first housing, an electrical switch associated with said second housing, actuable by variations in the level of said second manometer liquid pool to actuate said motor means in either direction, the level of said manometer liquid pool being determined by pressure of gas in said first housing, and the pressure of said gas being determined by the condition of the fluid being indicated relative to said pressure responsive member, an indicating means, gearing operatively connecting said indicating means to said motor for simultaneous actuation with said shaft, means for varying the angular inclination of said support relative to said base to compensate for variations proportioned to pressure in a condition of said fluid other than the condition indicated, by varying the mean vertical movement of said first-mentioned housing and its associated manometer liquid pool without varying the actual linear movement thereof, means to vary the angular inclination of said first housing relative to said support to maintain said first manometer liquid pool level regardless of the angle of inclination of said support, and means to vary the angle of said second housing relative to said base for corresponding leveling of said second manometer liquid pool.

7. In a fluid condition indicating system, a pressure responsive member adapted to be extended into a body of fluid, means for introducing gas under pressure into said pressure responsive member, a base, a support angularly disposed on said base, a first housing, means mounting said first housing on said support, a first manometer liquid pool in said first housing, a fluid connection between said pressure responsive member and said first housing, a second housing, means mounting said second housing on said support, a second manometer liquid pool in said second housing, a conduit connecting said first and second housings, a column of manometer liquid in said conduit, a linear track on said support, means carried by said first housing engaging said track for movement of said first housing therealong, a screw shaft threadedly engaged by said first housing, reversible motor means mounted on said support for rotating said screw to move said first housing, an electrical switch associated with said second housing, actuable by variations in the level of said second manometer liquid pool to actuate said motor means in either direction, the level of said manometer liquid pool being determined by pressure of gas in said first housing, and the pressure of said gas being determined by the condition of the fluid being indicated relative to said pressure responsive member, an indicating means, gearing operatively connecting said indicating means to said motor for simultaneous actuation with said shaft, means for varying the angular inclination of said support relative to said base to compensate for variations proportioned to pressure in a condition of said fluid other than the condition indicated, by varying the mean vertical movement of said first-mentioned housing and its associated manometer liquid pool without varying the actual linear movement thereof, means to vary the angular inclination of said first housing relative to said support to maintain said first manometer liquid pool in level position regardless of the angle of inclination of said support, means to vary the angle of said second housing relative to said base for corresponding leveling of said second manometer liquid pool, and means for securing said support, said first housing, and said second housing in angularly adjusted position.

8. In a liquid level measuring and recording motored manometer system, a pressure responsive tube adapted to be extended into a body of liquid, means for introducing gas under pressure into said tube, a base, a support angularly disposed on said base, a first housing, means pivotally mounting said first housing on said support, a mercury pool in said first housing, a fluid connection between said tube and said first housing, a second housing, means pivotally mounting said second housing on said support, a second manometer liquid in said second housing, a conduit connecting said first and second housings, a column of mercury in said conduit, a linear track on said support, means carried by said first housing engaging said track for movement of said first housing therealong, a screw shaft extending parallel to said track threadedly engaged by said first housing, reversible motor means fixedly mounted on said support for rotating said screw to move said first housing linearly along said track, an electrical switch associated with said second housing actuable by variations in the level of said second mercury pool to actuate said motor means in either direction, the level of said second mercury pool being determined by pressure of gas in said first housing and the pressure of said gas being determined by the level of the liquid being measured relative to said tube, a recording means, gearing operatively connecting said recording means to said motor for simultaneous actuation with said shaft, and means for varying the angular inclination of said support relative to said base and hence the angular inclination of said track to compensate for variations in specific gravity in said fluid by varying the mean vertical movement of said first-mentioned housing and its associated mercury pool without varying the actual linear distance traveled along said track.

9. In a liquid level measuring and recording motored manomter system, a pressure responsive tube adapted to be extended into a body of liquid, means for introducing gas under pressure into said tube, a base, a support angularly disposed on said base, a first housing, means pivotally mounting said first housing on said support, a mercury pool in said first housing, a fluid connection between said tube and said first housing, a second housing, means pivotally mounting said second housing on said support, a second manometer liquid in said second housing, a conduit connecting said first and second housings, a column of mercury in said conduit, a linear track on said support, means carried by said first housing engaging said track for movement of said first housing therealong, a screw shaft extending parallel to said track threadedly engaged by said first housing, reversible motor means fixedly mounted on said support for rotating said screw to move said first housing linearly along said track, an electrical switch associated with said second housing actuable by variations in the level of said second mercury pool to actuate said motor means in either direction, the level of said second mercury pool being determined by pressure of gas in said first housing and the pressure of said gas being determined by the level of the liquid being measured relative to said tube, a recording means, gearing operatively connecting said recording means to said motor for simultaneous actuation with said shaft, means for varying the angular inclination of said support relative to said base and hence the angular inclination of said track to compensate for variations in specific gravity in said fluid by varying the mean vertical movement of said first-mentioned housing and its associated mercury pool without varying the actual linear distance travelled along said track, means to vary the angular inclination of both said first housing and said second housing relative to said support to level said first and second mercury pools regardless of the angular inclination of said support, and means for securing said support, said first housing and said second housing in angularly adjusted position.

10. In a liquid level measuring and recording motored manometer system, a pressure responsive tube adapted to be extended into a body of liquid, means for introducing gas under pressure into said tube, a base, a support angularly disposed on said base, a first housing, means pivotally mounting said first housing on said support, a mercury pool in said first housing, a fluid connection between said tube and said first housing, a second housing, means pivotally mounting said second housing on said support, a second manometer liquid in said second housing, a conduit connecting said first and second housings, a column of mercury in said conduit, a linear track on said support, means comprising a first plate having rollers along one edge thereof, a second plate of bellcrank configuration pivotally connected to said first plate, a roller on the short leg of said second plate, and a resilient connection between the other leg of said second plate and said first plate, carried by said first housing engaging said track for movement of said first housing therealong, a screw shaft extending parallel to said track, a bracket having a threaded aperture therein carried by said first housing, said threaded aperture engaged by said screw shaft, reversible motor means fixedly mounted on said support for rotating said screw to move said first housing linearly along said track, an electrical switch associated with said second housing actuable by variations in the level of said second mercury pool to actuate said motor means in either direction, the level of said second mercury pool being determined by pressure of gas in said first housing and the pressure of said gas being determined by the level of the liquid being measured relative to said tube, a recording means, gearing operatively connecting said recording means to said motor for simultaneous actuation with said shaft, and means for varying the angular inclination of said support relative to said base and hence the angular inclination of said track to compensate for variations in specific gravity in said fluid by varying the mean vertical movement of said first-mentioned housing and its associated mercury pool without varying the actual linear distance travelled along said track.

11. In a liquid level measuring and recording motored manometer system, a pressure responsive tube adapted to be extended into a body of liquid, means for introducing gas under pressure into said tube, a base, a support angularly disposed on said base, a first housing, means pivotally mounting said first housing on said support, a mercury pool in said first housing, a fluid connection between said tube and said first housing, a second housing, means pivotally mounting said second housing on said support, a second manometer liquid in said second housing, a conduit connecting said first and second housings, a column of mercury in said conduit, a linear track on said support, means carried by said first housing engaging said track for movement of said first housing therealong, a screw shaft extending parallel to said track, threadedly engaged by said first housing, reversible motor means fixedly mounted on said support for rotating said screw to move said first housing linearly along said track, an electrical switch associated with said second housing actuable by variations in the level of said second mercury pool to actuate said motor means in either direction, an electrical network including a time delay circuit connected between said electrical switch and said motor means to eliminate hunting action of the motor means due to surging of the water level, the level of said second mercury pool being determined by pressure of gas in said first housing and the pressure of said gas being determined by the level of the liquid being measured relative to said tube, a recording means, gearing operatively connecting said recording means to said motor for simultaneous actuation with said shaft, and means for varying the angular inclination of said support relative to said base and hence the angular inclination of said track to compensate for variations in specific gravity in said fluid by varying the mean vertical movement of said first-mentioned housing and its associated mercury pool without varying the actual linear distance travelled along said track.

12. In a liquid level measuring and recording motored manometer system, a pressure responsive tube adapted to be extended into a body of liquid, means for introducing gas under pressure into said tube, a base, a support angularly disposed on said base, a first housing, means pivotally mounting said first housing on said support, a mercury pool in said first housing, a fluid connection between said tube and said first housing, a second housing, means pivotally mounting said second housing on said support, a second manometer liquid in said second housing, a conduit connecting said first and second housings, a column of mercury in said conduit, a linear track on said support, means carried by said first housing engaging said track for movement of said first housing therealong, a screw shaft extending parallel to said track threadedly engaged by said first housing, reversible motor means fixedly mounted on said support for rotating said screw to move said first housing linearly along said track, an electrical switch associated with said second housing actuable by variations in the level of said second mercury pool to actuate said motor means in either direction, the level of said second mercury pool being determined by pressure of gas in said first housing and the pressure of said gas being determined by the level of the liquid being measured relative to said tube, a recording means, gearing operatively connecting said recording means to said motor for simultaneous actuation with said shaft, means for varying the angular inclination of said support relative to said base and hence the angular inclination of said track to compensate for variations in specific gravity in said fluid by varying the mean vertical movement of said first-mentioned housing and its associated mercury pool without varying the actual linear distance travelled along said track, and a numerical indicator mechanism operatively connected to said gearing for indicating the liquid level at any existing moment.

13. In a liquid level measuring and recording motored manometer system, a pressure responsive tube adapted to be extended into a body of liquid, means for introducing gas under pressure into said tube, a base, a support angularly disposed on said base, a first housing, means pivotally mounting said first housing on said support, a mercury pool in said first housing, a fluid connection between said tube and said first housing, a second housing, means pivotally mounting said second housing on said support, a second manometer liquid in said second housing, a conduit connecting said first and second housings, a column of mercury in said conduit, a linear track on said support, means carried by said first housing engaging said track for movement of said first housing therealong, a screw shaft extending parallel to said track, threadedly engaged by said first housing, reversible motor means fixedly mounted on said support for rotating said screw to move said first housing linearly along said track, an electrical switch associated with said second housing actuable by variations in the level of said second mercury pool to actuate said motor means in either direction, the level of said second mercury pool being determined by pressure of gas in said first housing and the pressure of said gas being determined by the level of the liquid being measured relative to said tube, a graphic recording instrument for continuously recording the liquid level against time, gearing operatively connecting said graphic recording instrument to said motor for simultaneous actuation of said shaft, means including a rocker on said support and a pivoted connection between said rocker and said base for varying the angular inclination of said support relative to said base and hence the angular inclination of said track to compensate for variations in specific gravity in said fluid by varying the mean vertical movement of said first-mentioned housing and its associated mercury pool without varying the actual linear distance travelled along said track, and a numerical indicator mechanism operatively connected to said gearing for indicating the liquid level at any existing moment.

14. Apparatus for indicating a condition in a body of liquid comprising a container for a column of pressured gas adapted to be immersed into said body of liquid, means adjusting the pressure of the gas to balance the pressure of the liquid level, a housing containing a first pool of manometer liquid, a second housing containing a second pool of manometer liquid in fluid communication with said first housing, means applying the pressure of said column of gas against said first pool whereby change in the level of the liquid being measured varies the level of the manometer liquid in the second pool, a drive means, means actuable by variations in the level of the second pool to actuate said drive means, a connection between said drive means and said first housing for varying the vertical position of the first pool relative to the second pool until a balance is achieved, means for varying the vertical distance travelled by the first pool toward the balance position without varying the absolute distance travelled whereby to compensate for conditions in the body of liquid proportionate to pressure other than the condition being indicated, and a device for indicating the change of absolute distance travelled by the first pool.

15. Apparatus for measuring and recording variations in the level of a body of liquid comprising a container for a column of pressured gas adapted to be immersed into said body of liquid, means adjusting the pressure of the gas to balance the pressure of the liquid level, a housing containing a first pool of manometer liquid, a second housing containing a second pool of manometer liquid in fluid communication with said first housing, means applying the pressure of said column of gas against said first pool whereby change in the level of the liquid being measured varies the level of the manometer liquid in the second pool, a drive means, means actuable by variations in the level of the second pool to actuate said drive means, a connection between said drive means and said first housing for varying the vertical position of the first pool relative to the second pool until a balance is achieved, means for varying the vertical distance travelled by the first pool toward the balance position without varying the absolute distance travelled thereby to compensate for conditions in the body of liquid proportionate to pressure other than liquid level, and a graphic recorder for continuously recording the change of absolute distance travelled by the first pool against time.

References Cited in the file of this patent

UNITED STATES PATENTS

| | | |
|---|---|---|
| 1,261,262 | Meredith | Apr. 2, 1918 |
| 1,699,812 | Sartakoff | Jan. 22, 1929 |
| 2,266,955 | Borden | Dec. 23, 1941 |
| 2,380,177 | Hicks | July 10, 1945 |
| 2,389,508 | Hejduk | Nov. 20, 1945 |
| 2,441,149 | Hays | May 11, 1948 |
| 2,502,167 | Moore | Mar. 28, 1950 |
| 2,609,687 | Coleman | Sept. 9, 1952 |

FOREIGN PATENTS

| | | |
|---|---|---|
| 886,024 | France | June 15, 1943 |